US010967936B1

(12) United States Patent
Rodriguez Guevara

(10) Patent No.: US 10,967,936 B1
(45) Date of Patent: Apr. 6, 2021

(54) WATERCRAFT SYSTEM INCLUDING WATER AND/OR AIR PASSAGEWAYS

(71) Applicant: Borja Rodriguez Guevara, Palmdale, CA (US)

(72) Inventor: Borja Rodriguez Guevara, Palmdale, CA (US)

( * ) Notice: Subject to any disclaimer, the term of this patent is extended or adjusted under 35 U.S.C. 154(b) by 0 days.

(21) Appl. No.: 17/002,631

(22) Filed: Aug. 25, 2020

(51) Int. Cl.
| | |
|---|---|
| *B63B 1/38* | (2006.01) |
| *B63B 1/34* | (2006.01) |
| *B63H 1/30* | (2006.01) |
| *B63B 32/50* | (2020.01) |
| *B63B 1/40* | (2006.01) |
| *B63H 7/00* | (2006.01) |

(52) U.S. Cl.
CPC ............... *B63B 1/38* (2013.01); *B63B 1/34* (2013.01); *B63B 32/50* (2020.02); *B63H 1/30* (2013.01); *B63H 7/00* (2013.01); *B63B 1/40* (2013.01); *B63B 2001/387* (2013.01)

(58) Field of Classification Search
CPC ....... B63B 1/32; B63B 1/34; B63B 2001/345; B63B 1/36; B63B 1/38; B63B 2001/382; B63B 2001/385; B63B 2001/387; B63B 1/40; B63B 32/00; B63B 32/50; B63H 7/00; B63H 7/02; Y02T 70/10
USPC ........................... 114/67 A, 288–290; 441/74
See application file for complete search history.

(56) References Cited

U.S. PATENT DOCUMENTS

| | | | | |
|---|---|---|---|---|
| 1,784,071 A | * | 12/1930 | Norman .................... | B63B 1/38 114/289 |
| 1,894,256 A | * | 1/1933 | De Ganahl ................ | B63B 1/38 114/67 A |
| 2,172,674 A | * | 9/1939 | Frost ........................ | B63B 1/20 114/288 |
| 2,382,150 A | * | 8/1945 | Hartman .................. | B63B 32/20 441/68 |
| 3,662,700 A | * | 5/1972 | Roumejon ................ | B63B 1/38 114/67 A |
| 4,344,641 A | * | 8/1982 | Lehn ........................ | A63C 5/04 114/67 A |
| 7,992,507 B2 | * | 8/2011 | Adams ..................... | B63B 1/38 114/43 |

FOREIGN PATENT DOCUMENTS

| | | | | |
|---|---|---|---|---|
| DE | 2828858 A1 | * | 1/1980 | ............... B63B 1/38 |
| DE | 3121402 A1 | * | 12/1982 | ............ B63B 32/50 |
| DE | 3422406 A1 | * | 12/1985 | ............... B63B 1/38 |
| FR | 2515125 A1 | * | 4/1983 | ............... B60V 3/06 |

* cited by examiner

*Primary Examiner* — Ajay Vasudeva
(74) *Attorney, Agent, or Firm* — Cohen I.P. Law Group, P.C.; Michael N. Cohen

(57) ABSTRACT

A watercraft system including one or more air passageways and/or one or more water passageways is provided. The air passageways may extend from an upper surface of the watercraft, through the body of the watercraft, to an underneath surface of the watercraft. The water passageways may extend from an underneath forward or side portion on the watercraft, through the body of the watercraft, to a rear portion of the watercraft. The air and/or water passageways may be constricting from the inlets to the outlets so that the air and/or water is accelerated through the passageways during use of the craft. In this way, the release of the accelerated air and/or water decreases the craft's drag and provides the craft a forward thrust.

20 Claims, 14 Drawing Sheets

WATERCRAFT SYSTEM INCLUDING WATER AND/OR AIR PASSAGEWAYS

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to watercrafts, including watercrafts with through-body water and air passageways.

BACKGROUND

Watercraft sports such as surfing, paddle boarding, sailing, and other types of watercraft sports are extremely popular throughout the world. As is known in the art, the design of the watercrafts, such as the design of the crafts' bodies or hulls, is an especially important element that may determine the performance of the watercrafts and the overall enjoyment of the watercraft sports.

If the watercrafts experience significant drag in the water during use, it may be difficult to propel the craft forward (especially when the craft is manually propelled such as with surfboards or paddle boards), and the experience may be tiresome and not very pleasing.

And in cases where the watercraft is used during a competition or race, the speed at which the watercraft may move through the water and its maneuverability therein may be of the utmost importance.

Accordingly, there is a need for a watercraft system that decreases the drag inflicted by the water onto the watercraft, and that improves the watercraft's potential for increased speed and improved maneuverability. According, there is a need for a watercraft system that includes air passageways and/or water passageways that pass through the body of the watercraft thereby accomplishing these design goals.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

As used herein, unless used otherwise, the following terms and abbreviations have the following meanings:

Watercraft generally refers to any type of object adapted to float, partially float, be submerged, be partially submerged, or be otherwise positioned in or on water in any combination thereof. A watercraft may refer to any type of boat, ship, water vessel, surfboard, paddle board, stand-up-paddle board, wind surfer board, boogie board, knee-board, kite surfing board, short board, long board, foam board, wake board, skim board, submersible, submarine, off-shore boat, racing-boat, fishing-boat, commercial-boat, sail boat, motor boat, row boat, yacht, cruise-ship, hydroplane, kayak, canoe, raft, buoy, any other type of marine craft and any combination thereof. In some embodiments, a watercraft may be adapted to move on or within the water, while in other embodiments a watercraft may be generally stationary. Any movement of a watercraft may be facilitated by motors, engines, sails, oars, waves, currents, tides, human arms and/or legs, other types of movement mechanisms and any combination thereof. The movement mechanisms may be driven by electricity, combustible fuel, human power, animal power, wind power, solar power, wave power, tide power, current power, other types of power and any combination thereof. A watercraft may be adapted to support humans, animals, plants, and other types of living organisms, as well as non-living objects or devices such as computers, robotic equipment, electrical surveillance equipment, navigational equipment, communications equipment, cargo, other types of equipment and/or objects and any combination thereof.

In general, the assembly according to exemplary embodiments hereof includes a watercraft with one or more air passageways passing from an upper surface of the craft to an underneath surface of the craft, and/or one or more water passageways passing from a forward (towards the bow) underneath surface to a rear (towards the stern) underneath surface. In some embodiments, the craft also may include one or more water passageways passing from the sides (e.g., the port side and/or the starboard side) to an underneath surface.

When in use, the upper surface may be adapted to typically reside above the water line (not submerged) and the underneath surface may be adapted to typically reside below the water line (submerged). In this way, air may pass through the watercraft from above the craft to below the craft, and water may pass from submerged forward and/or side portions of the craft to submerged rear portions of the craft. However, it is understood that the upper surface of the watercraft may be adapted to reside below the water line (at least partially) as necessary.

Referring now to FIGS. 1-17, the watercraft system 10 according to exemplary embodiments hereof will be described in further detail.

Figure 1:
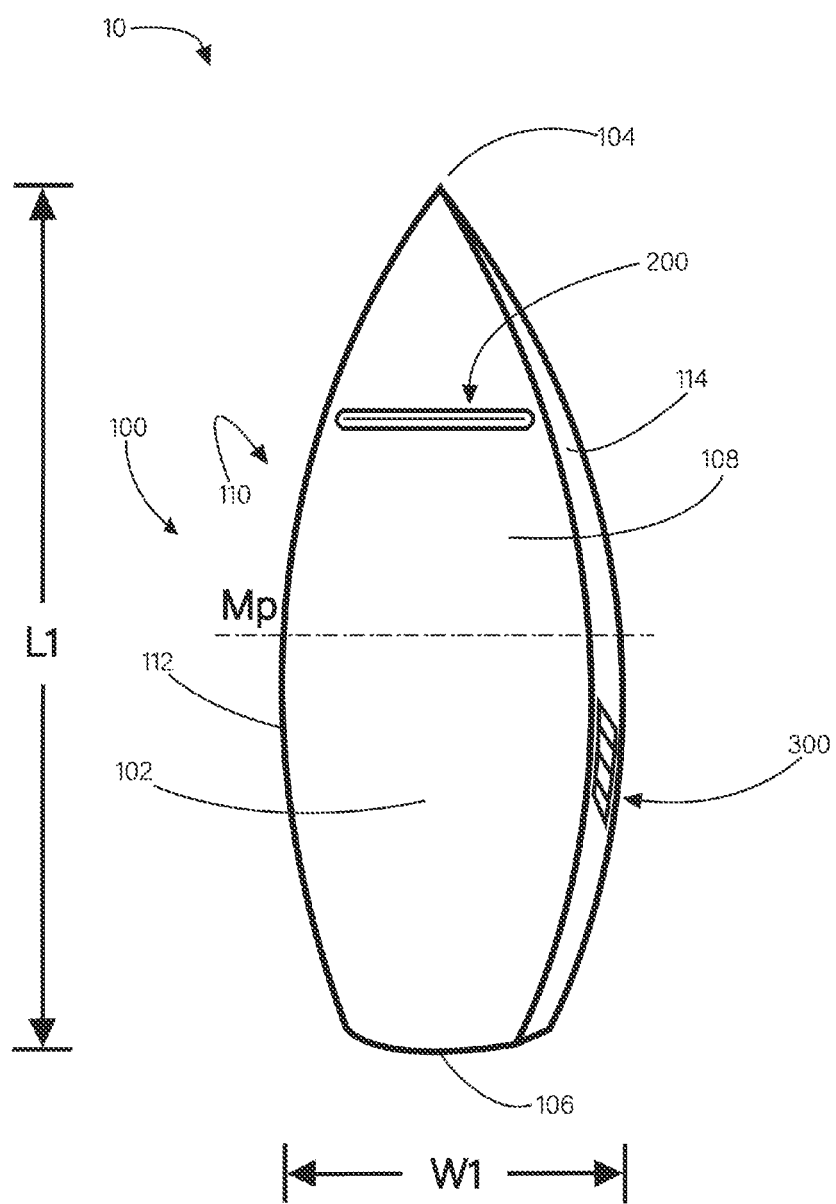
FIGS. 1-2 show aspects of a watercraft system according to exemplary embodiments hereof.
Figure 2:
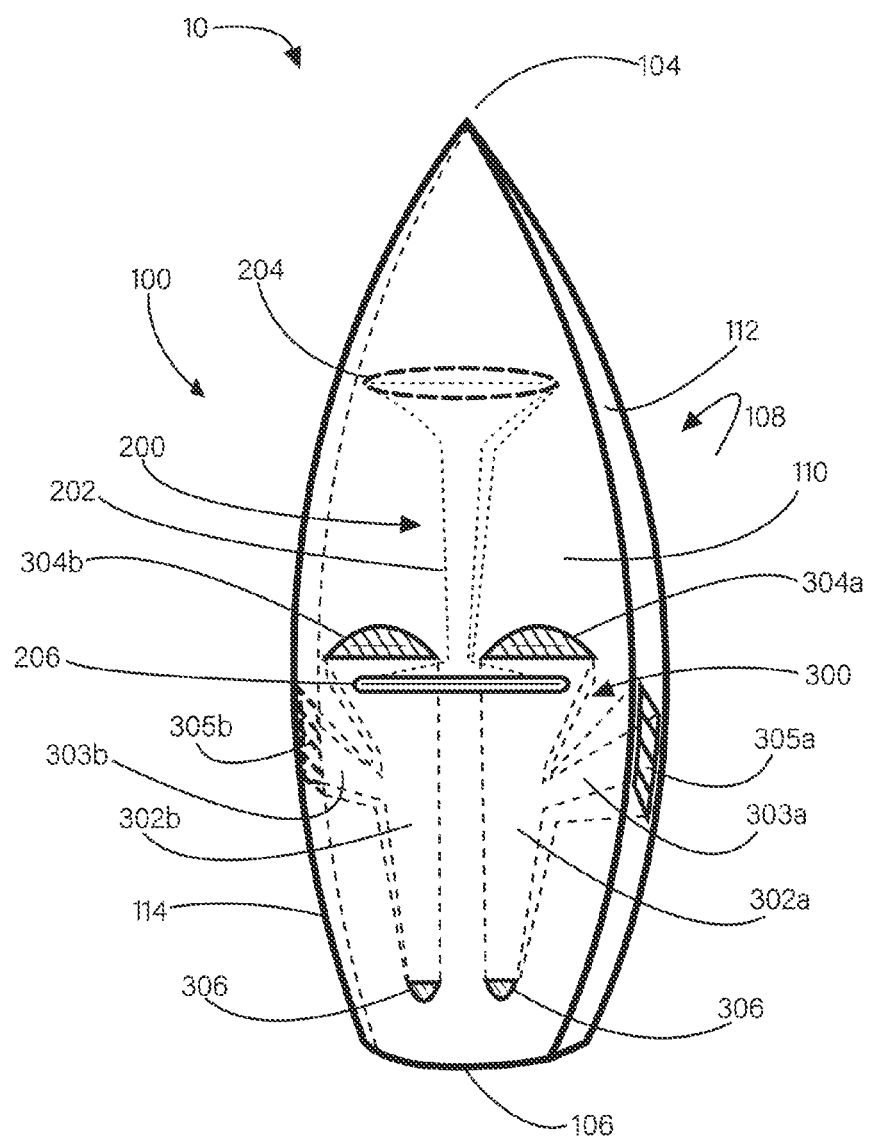

In one exemplary embodiment hereof as shown in FIGS. 1-2, the watercraft system 10 includes a body 100, an air passageway system 200 and a water passageway system 300. The system 10 may include other elements and components as necessary to fulfill its functionalities.

For the purposes of this specification, the system 10 will be described primarily in relation to its implementation with a surfboard. However, it is understood that the invention may be implemented with any type of watercraft as described herein or otherwise, and that the scope of the system 10 is not limited in any way by the type of watercraft that the system 10 may include.

Watercraft Body

In one exemplary embodiment as shown in FIGS. 1-2, the body 100 includes a surfboard 102 (or other types of watercrafts) with a front end 104 (also referred to as the bow), a back end 106 (also referred to as the stern), a top side 108 (also referred to as the deck), a bottom side 110, a left side 112 and a right side 114. The length L1 of the board 102 is be defined as the distance between the front 104 and the back 106, with a midpoint $M_P$ located at halfway therebetween (or at one-half L1). The width of the board 102 at the midpoint $M_P$ is shown as width W1. The median plane MD of the body 100 extends from the front 104 to the back 106 and divides the body 100 in mirroring left and right portions.

The body 100 of the surfboard 102 may be formed as is generally known in the art using any suitable materials and techniques. This will be described in further detail in other sections.

In some embodiments, the surfboard 102 is adapted to support a user on the top side 108, typically either standing or in a prone position.

Air Passageway System

Figure 3:
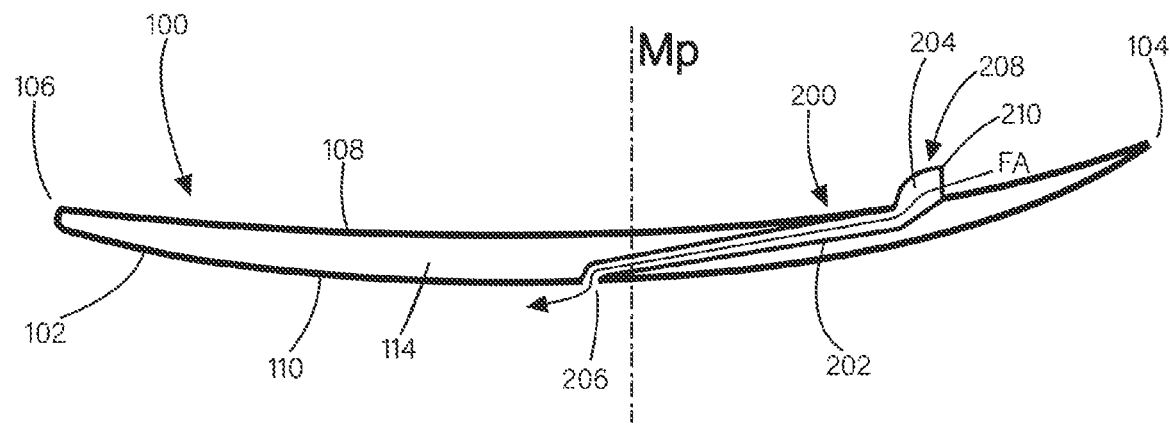
FIGS. 3-5B show aspects of an air passageway system according to exemplary embodiments hereof.
Figure 4:
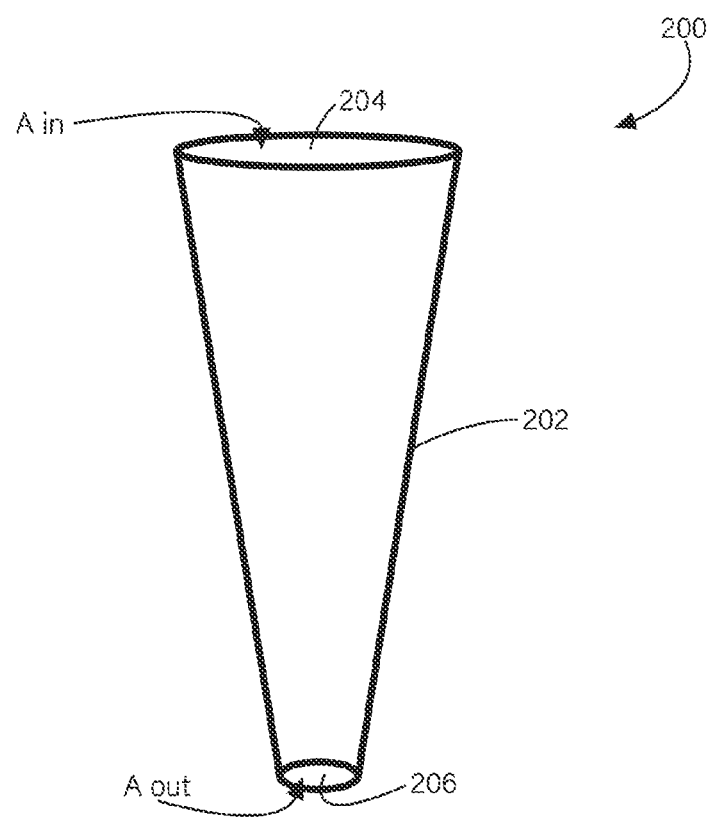

In one exemplary embodiment hereof as shown in FIGS. 3-4, the air passageway system 200 includes one or more air passageways 202 that extend through the board 102 from its top 108 to its bottom 110. Accordingly, the air passageway 202 may include a passageway inlet 204 configured with the board's top 108 and a passageway outlet 206 configured with the board's bottom 110. The inlet 204 may be configured with an inlet vent 208 that may be adapted to capture air from above the top surface 108 and guide it into the inlet 204. It may be preferable that the vent 208 generally match the footprint size of the inlet 204. The vent 208 may include a shroud 210 with an opening facing the front 104 of the board 102 so that as the board 102 travels forward (or otherwise), air may pass into the shroud 210 from the front and be directed into the inlet 204. From there, the air may generally flow through the air passageway 202 (through the board's body 102) and out the bottom outlet 206 as shown by the air flow path arrow $F_A$.

In some embodiments, the inlet 204 and/or the vent 208 may include a mesh or grating covering to obstruct objects and/or particles (e.g., kelp) from entering into the inlet 204 and air passageway 202.

In some embodiments, the inlet 204 is generally located towards the front 104 of the board 102, and the outlet is generally located towards the back 106 of the board 102. For example, the inlet 204 may be positioned between the midpoint $M_P$ of the board 102 and the front 104 of the board 102, and the outlet 206 may be positioned between the midpoint $M_P$ and the back 106 of the board 102. In some embodiments, the inlet 204 may be located about halfway between the midpoint $M_P$ and the front 104 of the board 104. In some embodiments, the outlet 206 may be generally located closer to the midpoint $M_P$ than to the rear 106. In other embodiments, the outlet 206 may be located generally at the midpoint $M_P$ or slightly forward from the midpoint $M_P$. However, it is understood that the inlet 204 and/or the outlet 206 may be located in any location on the board 102 as necessary, and that the scope of the system 10 is not limited in any way by the location of the inlet 204 and/or the outlet 206.

As is known in the art, surfboards 102 may be manufactured using a variety of techniques. For example, some surfboards 102 are produced by starting with a "blank" Polystyrene (EPS) or Polyurethane (PU) foam core that generally matches the desired size of the end product. The blank may include one or more sheets of material (glued together as required) and cut to size. The blank may include a "stringer" comprising a strip of strengthening material like wood glued longitudinally into the foam giving it strength and flex memory. The blank may then be cut and shaped to the desired shape and size of the end-result surfboard. The next step may include applying a fiberglass cloth to the entire length of the blank to add strength. A laminating resin may then be applied to the fiberglass cloth to bond the cloth to the board, and upon drying, the board may be sanded to form its final shape. To provide the board with a high gloss finish, a final coating of resin may be applied and buffed.

Other surfboard manufacturing processes may include foam molding (referred to as Pop Outs), injection molding, other manufacturing methodologies and any combination thereof.

In some embodiments, the air passageway system 200 may be formed into the board 102 using any suitable means during any suitable step of a surfboard manufacturing process.

In one embodiment, the air passageway system 200 may be formed into the blank by carving the passageway 202 directly into the blank. Once the passageway 202 has been formed, the inner surfaces of the passageway 202 may be coated with a fiberglass, resin, or other materials to seal the surfaces and to add strength to the passageway 202. It may be preferable that the surfaces are sealed to be watertight so that water may not penetrate the surfaces and enter the interior of the blank body during use.

In another embodiment, the air passageway system 200 may be formed separately from the blank and subsequently inserted into the blank. In this example, the passageway 202 may be molded or otherwise formed out of fiberglass, plastic, carbon fiber, Kevlar, other types of suitable materials and any combination thereof. Once molded, the passageway 202 may be inserted into the blank by carving out a portion of the blank adequate to receive the passageway 202, inserting the passageway 202, and then sealing the junction between the blank and the passageway 202 with a resin (or other suitable material) to be watertight.

In another embodiment, the air passageway 202 may be molded, sculpted or otherwise formed, and then insert molded with the blank. As is known in the art, insert molding is the process of molding one part onto a prefabricated part (the insert piece, and in this case, the air passageway 202). The insert piece is placed into the mold cavity as a separate component that is then encapsulated (at least partially) during the molding process. In this way, the material of the blank may be bonded with the passageway 202 during the molding process.

In another embodiment, the air passageway 202 may be molded directly into the blank using one or more mold sliders to form the air passageway 202 during the molding process. As is known in the art, mold sliders are moving parts within a mold that move into place prior to injection (typically during the closing of the mold) and that move out of place after the injection (typically during the opening of the mold). While in place, they form the passageway 202 within the cavity, and when removed, the injected part including an integrally formed air passageway 202 may be removed from the mold. The inner surfaces of the air passageway 202 may then be coated with fiberglass, resin, or other materials to seal the surfaces and to add strength to the passageway 202. It may be preferable that the surfaces are sealed to be watertight so that water may not penetrate the surfaces and enter the interior of the blank body during use.

In any event, it is understood that the air passageway(s) 202 may be formed into the surfboard 202 using any technique, as described above or otherwise, and that the scope of the assembly 10 is not limited in any way by the way in which the air passageway(s) 202 are formed or created.

FIG. 4 depicts an example air passageway 202 shown alone (without the board 102) for clarity. In one embodiment hereof to be used for initial demonstration, the air passageway 202 is generally frustum-shaped with an inlet cross-sectional area $A_{IN}$ and an outlet cross-sectional area $A_{OUT}$. Note, however, that the planes defined by the top opening 204 and the bottom opening 206 may be, but need not be, parallel with one another. Accordingly, the air passageway 202 may not be true frustum shaped. In some embodiments, the inlet cross-sectional area $A_{IN}$ is greater than the outlet cross-sectional area $A_{OUT}$ ($A_{IN}$>$A_{OUT}$). In this way, the air passageway 202 may constrict from its inlet 204 to its outlet 206.

In some embodiments, the inlet cross-sectional areas $A_{IN}$ and/or the outlet cross-sectional areas $A_{OUT}$ may be of any suitable shape. For example, the inlet and/or outlet cross-sectional areas may be rectangular, oval-shaped, circular, oblong, square, trapezoidal, any other type of shape or form and any combination thereof.

In some embodiments, the sides of the passageway 202 are generally linear so that the cross-sectional area transitions (constricts) linearly from $A_{IN}$ at the top to $A_{OUT}$ at the bottom as shown. In other embodiments, the cross-sectional areas may transition (constrict) differently in different portions of the air passageway 202. In some embodiments, the air passageway 202 may constrict along one dimension and/or along two dimensions.

As is known in the art of fluid dynamics, a fluid's velocity increases as it passes through a constriction in accord with the principle of mass continuity, while its static pressure decreases in accord with the principle of conservation of mechanical energy (Bernoulli's principle). So, any gain in kinetic energy a fluid may attain due to its increased velocity through a constriction is balanced by a drop in pressure.

Given the above, air passing from the inlet 204 through the constricting passageway 202 to the outlet 206 will experience a reduction in pressure and an increase in velocity. As the air passes out through the outlet 206 with an increased velocity, the flow of air is introduced at the bottom interface between the bottom 110 of the board 102 and the water, thereby reducing drag and friction between the board 102 and the water. This may be referred to as an air lubrication effect.

In some embodiments, during use, the introduction of the accelerated airflow to the bottom 110 of the board 102 by the air passageway system 200 may increase the board's hydrodynamic lift causing the board 102 to lift upward within the water. This in turn may decrease the displaced volume of water by the board 102 resulting in the board experiencing a planing effect. In this way, the board 102 may more easily glide on the water with improved efficiency, speed and agility.

It is understood that the above example is meant for demonstration and that the air passageway(s) 202 may include any number of different architectures. It is also understood that the scope of the system 10 is not limited in any way by the architecture of the air passageways 202 as long as the air passageways are generally constricting overall from the inlets 204 to the outlets 206.

Figure 5A:
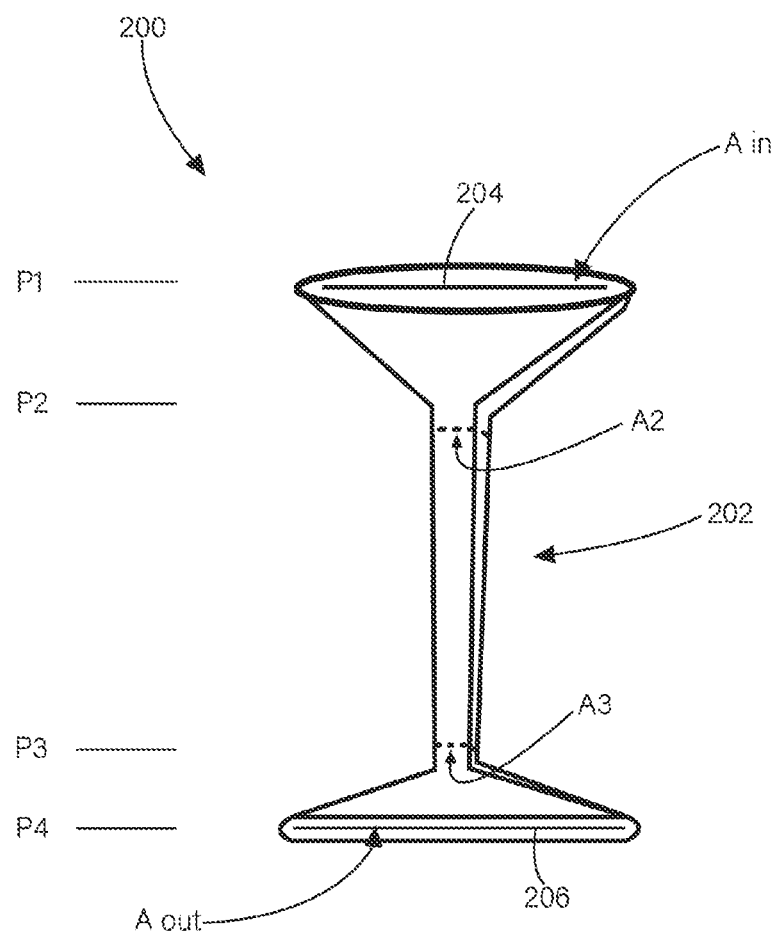

For example, in some embodiments as shown in FIG. 5A, the air passageway 202 may include a form in which the inlet cross-sectional areas transition differently along different portions of the passageway 202. For example, $A_{IN}$ decreases rapidly (and preferably linearly) from $A_{IN}$ at P1 to an intermediary cross-sectional area $A_2$ at P2. From there, the cross-sectional area may decrease more slowly (and preferably linearly) from $A_2$ at P2 to $A_3$ at P3. From there, the cross-sectional area may increase (again, possibly more rapidly and preferably linearly) from $A_3$ at P3 to $A_{OUT}$ at P4. It may be preferable that $A_{IN}$ is greater than the outlet cross-sectional area $A_{OUT}$ ($A_{IN}$>$A_{OUT}$) so that the air exiting the outlet 206 includes an airflow at an increased velocity compared to the airflow input at the inlet 204.

In some embodiments, the cross-sectional areas (e.g., $A_{IN}$, $A_{OUT}$, $A_2$, $A_3$, and including any other cross-section along the air path $F_A$, etc.) may include cross-sectional shapes such as circular, oval shaped (FIG. 4), rectangular (FIG. 5), square, triangular, trapezoidal, other types of shapes and/or forms and any combination thereof. It is understood that the passageway's cross-sectional areas may include any shape or form of cross-sectional shape(s), and that the shape(s) of the cross-sectional areas need not match along the length of the air passageway 202. It is also understood that the scope of the system 10 is not limited in any way by the shape or form of the air passageway's cross-sectional areas.

Figure 5B:
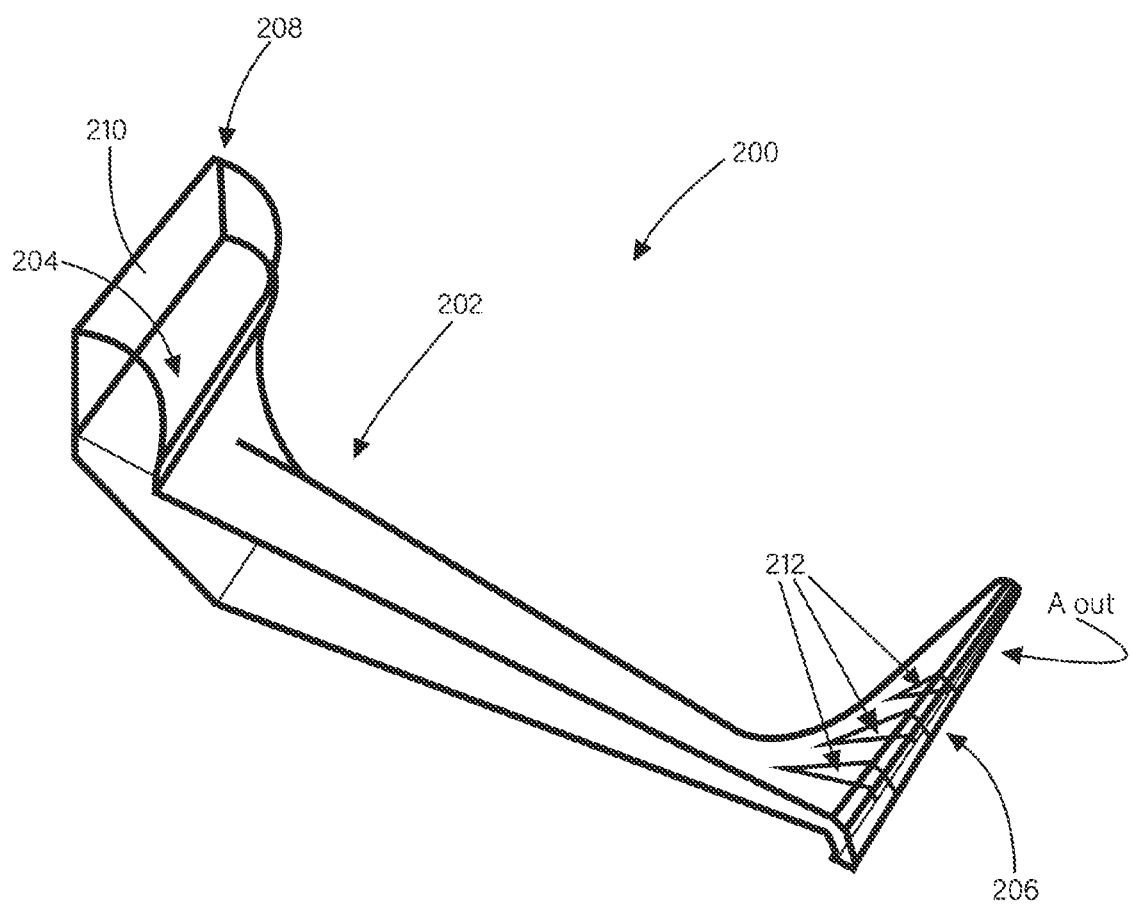

In some embodiments as shown in FIG. 5B, the outlet 206 may include one or more diffusers 212 that may help spread the output air evenly across the outlet cross-sectional area $A_{OUT}$ as the air passes out of the outlet 206. The one or more diffusers 212 may include channels, walls, openings, other types of diffusing elements and any combinations thereof. In some embodiments, the diffusers 212 may be constricting from the input to the diffusers 212 to the outlet of the diffusers 212 and of the air passageway 206.

In some embodiments, the air passageway system 200 may include one air passageway 202, and in other embodiments, the air passageway 200 may include a plurality of air passageways 202. When the system 200 includes two or more air passageways 202, the passageways 202 may be arranged in any relation to one another, such as, without limitation, side-by-side, in series (front to back), offset side-by-side, parallel with one another, at offset angles with respect to one another, overlapping, in any other position and/or orientation with respect to one another and in any combination thereof. In addition, the air passageways 202 may include matching and/or differing dimensions (widths, lengths, etc.). In addition, the air passageways 202 may include matching and/or differing cross-sectional areas (e.g., $A_{IN}$, $A_{OUT}$, $A_2$, $A_3$, etc.) along their lengths. It is understood that the air passageways 202 may include any type of matching and/or differing forms, shapes, architectures, materials, positions, orientations and other types of characteristics, none of which limit the scope of the system 10 in any way.

Water Passageway System

Figure 6:
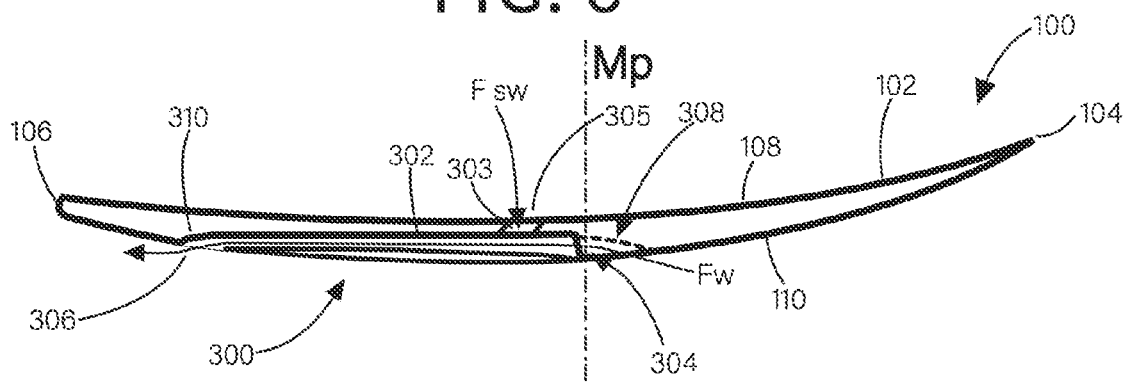
FIGS. 6-11 show aspects of a water passageway system according to exemplary embodiments hereof.
Figure 7:
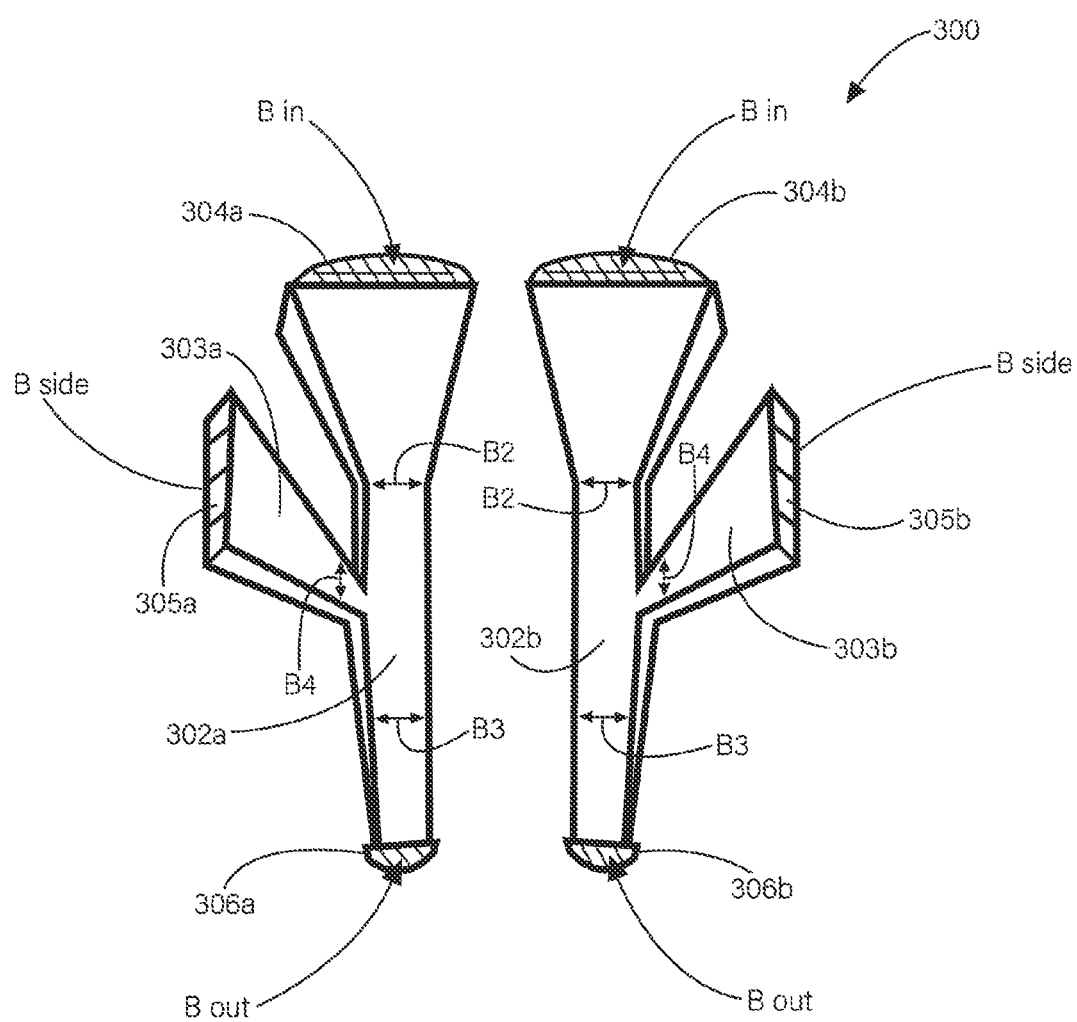

In one exemplary embodiment hereof as shown in FIGS. 6-7, the water passageway system 300 includes one or more central water passageways 302 that extend through the board 102 from a forward position on its bottom 110 to a rear position on its bottom 110. Accordingly, the water passageway 302 may include one or more passageway inlets 304 configured with the board's bottom 110 at a forward position and one or more outlets 306 configured with the board's bottom 110 at a rear position.

In some embodiments, the water passageway system 300 includes one or more side water passageways 303 that extend through the board 102 from the left 112 and/or right side 114 of the board 102 to the one or more central water passageways 302. In this way, the left side and/or right side passageways 303 may be in communication with the one or more central water passageways 302.

In some embodiments, the inlets 304, 305 may include a mesh or grating covering to obstruct objects and/or particles (e.g., kelp) from entering into the inlets 304, 305 and water passageways 302, 303.

Given the above, while in use, as the board 102 travels forward (or otherwise), water may pass into the forward inlet(s) 304 and flow through the central water passageway(s) 302 (through the board's body 102) and out the rear outlet(s) 306 as shown by the water flow path arrow $F_W$. In addition, water also may pass into the side inlet(s) 305 and flow through side water passageway(s) 303 and into the central water passageway(s) 302 (as shown by the water flow path arrow $F_{SW}$) where it may join water flowing from the forward inlet(s) 304 to the rear outlet(s) 306 and out.

With regards to the forming, manufacturing and/or general implementation of the water passageway system 300 into the board 102, all or some of the details described with respect to the forming, manufacturing and/or general implementation of the air passageway system 200 into the board 102 also may apply to the water passageway system 300. With regards to the materials used to form the water passageway system 300, the materials described in relation to the forming of the air passageway system 200 also may apply to the water passageway system 300. Accordingly, in order to avoid duplicative information, this information will not be described again here but it is understood that it may apply here as well.

In some embodiments, the forward bottom inlet(s) 304 are generally located at about midpoint $M_P$ of the board 102, slightly forward the midpoint $M_P$, or slightly behind the midpoint $M_P$. In addition, the side inlet(s) 305 are generally located between the midpoint $M_P$ and the back 106, and the rear bottom outlet(s) 306 are generally located towards the back 106 of the board 102. In other embodiments, the side inlet(s) 305 may be located at about the midpoint $M_P$ of the board 102, slightly forward the midpoint $M_P$, or slightly behind the midpoint $M_P$. However, it is understood that the inlets 304, 305 and/or the outlets 306 may be located in any location on the board 102 as necessary, and that the scope of the assembly 10 is not limited in any way by the location of the inlets 304, 305 and/or the outlets 306.

In one embodiment as shown in FIG. 7, the system 300 (shown alone for clarity) includes two side-by-side central water passageways 302a, 302b, with each passageway 302a, 302b including a forward inlet 304a, 304b, respectively, and a rear outlet 306a, 306b, respectively. The left water passageway 302a may include a left side water passageway 303a extending from a side inlet 305a in the board's left side 112 to the central passageway 302a, and the right water passageway 302b may include a right side water passageway 303b extending from a side inlet 305b in the board's right side 114 to the central passageway 302b.

In some embodiments, the left side passageway 303a joins the central passageway 302a between the passageway's inlet 304a and its outlet 306a, and the right side passageway 305b joins the central passageway 302b between the passageway's inlet 304b and its outlet 306b. While this example depicts one left side passageway 303a and one right side passageway 303b, it is understood that the system 300 may include any number of side passageways 303 on either the left or the right sides, and that the descriptions herein pertaining to the left and right side passageways 303a, 303b and inlets 305a, 305b also may pertain to additional side passageways 303 and inlets 305.

In some embodiments, the water inlet(s) 304 include cross-sectional areas $B_{IN}$ and the water outlets 306 include cross-sectional areas $B_{OUT}$. In some embodiments, the water passageway 302 includes intermediary cross-sectional areas $B_2$, $B_3$, etc. In some embodiments, the side water inlets 305 include cross-sectional areas $B_{SIDE}$ and intermediary cross-sectional areas $B_4$ at the junction between the side water passageways 303 and the central water passageways 302.

In some embodiments, the inlet cross-sectional area $B_{IN}$ is greater than the intermediary cross-sectional area $B_2$, and the passageway 302 narrows (preferably linearly) therebetween. In addition, the intermediary cross-sectional area $B_2$ is greater than the intermediary cross-sectional area $B_3$, and the passageway 302 narrows (preferably linearly) therebetween. In addition, the intermediary cross-sectional area $B_3$ is greater than the outlet cross-sectional area $B_{OUT}$, and the passageway 302 narrows (preferably linearly) therebetween. Accordingly, the central passageways 302 are constricting from the inlets 304 to the intermediary cross-sectional areas $B_2$, and again from the intermediary cross-sectional areas $B_2$ to the intermediary cross-sectional areas $B_3$, and again from the intermediary cross-sectional areas $B_3$ to the outlet cross-sectional areas $B_{OUT}$. In some embodiments, the outlet's cross-sectional area $B_{OUT}$ may be larger than the intermediary cross-sectional area $B_3$, but it is preferable that the outlet's cross-sectional area $B_{OUT}$ is less than the inlet's cross-sectional area $B_{IN}$ ($B_{IN} > B_{OUT}$) so that overall the water passageway 302 is constricting thereby causing the water's velocity to increase from the inlet 304 to the outlet 306. In some embodiments, the water passageway 302 may constrict along one dimension and/or along two dimensions.

In some embodiments, the side inlet cross-sectional areas $B_{SIDE}$ are greater than the intermediary cross-sectional areas $B_4$ and the passageway 303 narrows (preferably linearly) therebetween.

In some embodiments, the inlet cross-sectional areas $B_{IN}$, $B_2$, $B_3$, $B_4$, $B_{OUT}$, etc. may be of any suitable shape. For example, the cross-sectional areas may be rectangular, oval-shaped, circular, oblong, square, trapezoidal, any other type of shape or form and any combination thereof.

As described above, it is known in the art of fluid dynamics that a fluid's velocity increases as it passes through a constriction in accord with the principle of mass continuity, while its static pressure decreases in accord with the principle of conservation of mechanical energy (Bernoulli's principle). So, any gain in kinetic energy a fluid may attain due to its increased velocity through a constriction is balanced by a drop in pressure.

Given the above, water passing from a forward inlet 304 through a constricting passageway 302 to a rear outlet 306 will experience a reduction in pressure and an increase in velocity. In addition, water passing from a side inlet 305 through a constricting water passageway 303 will experience a reduction in pressure and an increase in velocity. As the water passes out through the outlet 306 with an increased velocity, the flow of water is introduced at the back 106 bottom 110 of the board 102 thereby providing the board 102 a forward thrust. This forward thrust, coupled with the hydrodynamic lift created by the air passageway system 200, results in an accelerated forward motion and a further reduction in the displaced volume of water by the board 102, thereby increasing the board's planing effect, efficiency, speed and agility.

It is understood that the above example is meant for demonstration and that the central water passageway(s) 302 and/or the side water passageway(s) 303 may include any number of different architectures. It is also understood that the scope of the system 10 is not limited in any way by the architecture of the water passageways 302, 303 as long as the water passageways are generally constricting overall from the forward inlets 304 to the rear outlets 306 ($B_{IN} > B_{OUT}$) and/or from the side inlets 305 to the junction between the side passageways 303 and the corresponding central passageways 302 ($B_{SIDE} > B_4$). For example, in some embodiments, the cross-sectional area of the central water passageway 302 may narrow linearly from $B_{IN}$ to $B_{OUT}$.

In some embodiments, the cross-sectional areas (e.g., $B_{IN}$, $B_{OUT}$, $B_2$, $B_3$, $B_{SIDE}$, $B_4$, and including any other cross-section along the water flow path $F_W$, etc.) may include cross-sectional shapes such as circular, oval shaped (FIG. 4), rectangular (FIG. 5), square, triangular, trapezoidal, other types of shapes and/or forms and any combination thereof. It is understood that the cross-sectional areas may include any shape or form of cross-sectional shape(s), and that the shape(s) of the cross-sectional areas need not match along the length of the water passageways 302, 303. It is also understood that the scope of the system 10 is not limited in any way by the shape or form of the water passageway's cross-sectional areas.

It is understood that when the water passageway system 300 includes two or more water passageways 302, 303, the passageways 302, 303 may be arranged in any relation to one another, such as, without limitation, side-by-side, in series (front to back), offset side-by-side, parallel with one another, at offset angles with respect to one another, overlapping, in any other position and/or orientation with respect to one another and in any combination thereof. In addition, the water passageways 302, 303 may include matching and/or differing dimensions (widths, lengths, etc.). In addition, the water passageways 302, 303 may include matching and/or differing cross-sectional areas (e.g., $B_{IN}$, $B_{OUT}$, $B_2$, $B_3$, $B_{SIDE}$, $B_4$, etc.) along their lengths. It is understood that the water passageways 302, 303 may include any type of matching and/or differing forms, shapes, architectures, materials, positions, orientations and other types of characteristics, none of which limit the scope of the system 10 in any way.

Figure 8:
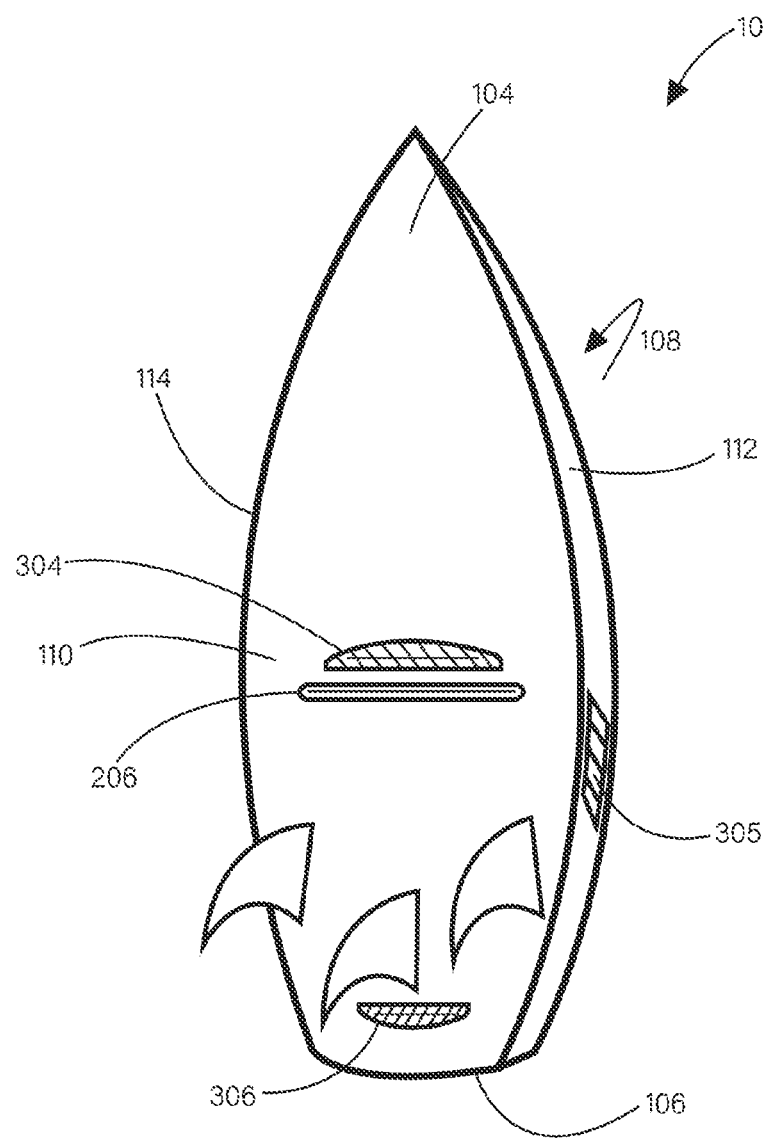
Figure 9:
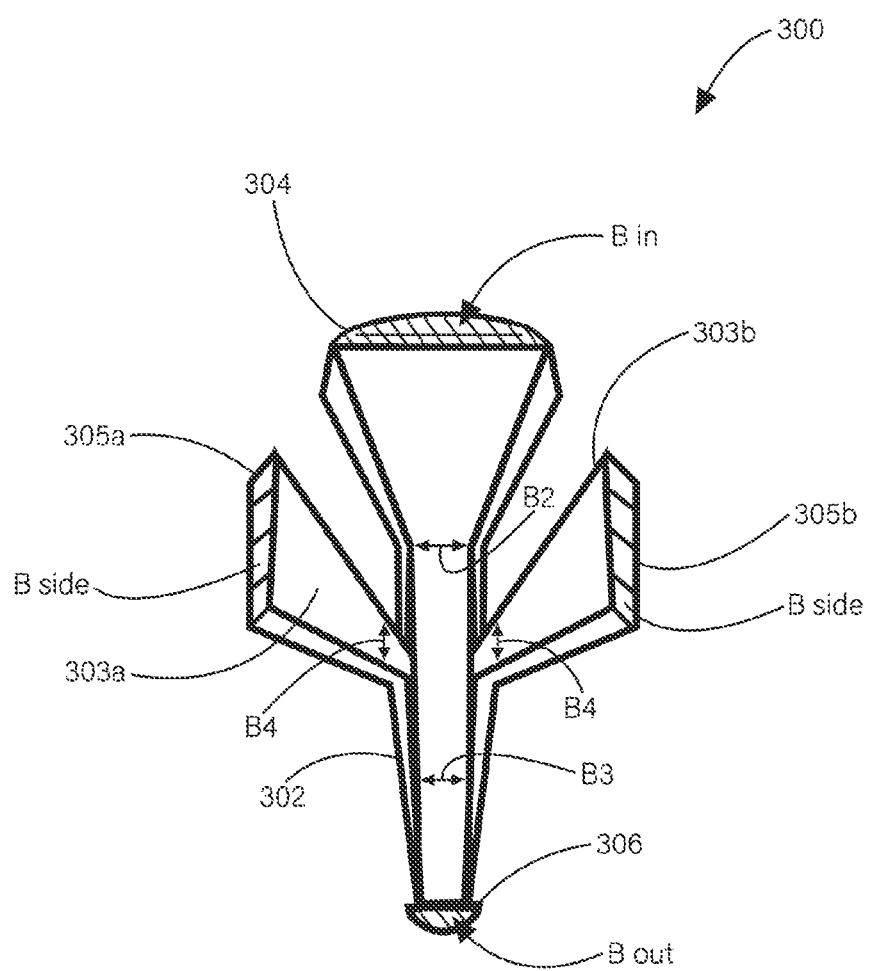

In other embodiments as shown in FIGS. 8-9, the water passageway system 300 may include a single central water passageway 302 with a left side water passageway 303a and a right side water passageway 303b. It is understood that the details described above regarding the embodiment as shown in FIG. 7 also may pertain to this embodiment as shown in FIG. 9.

Figure 10:
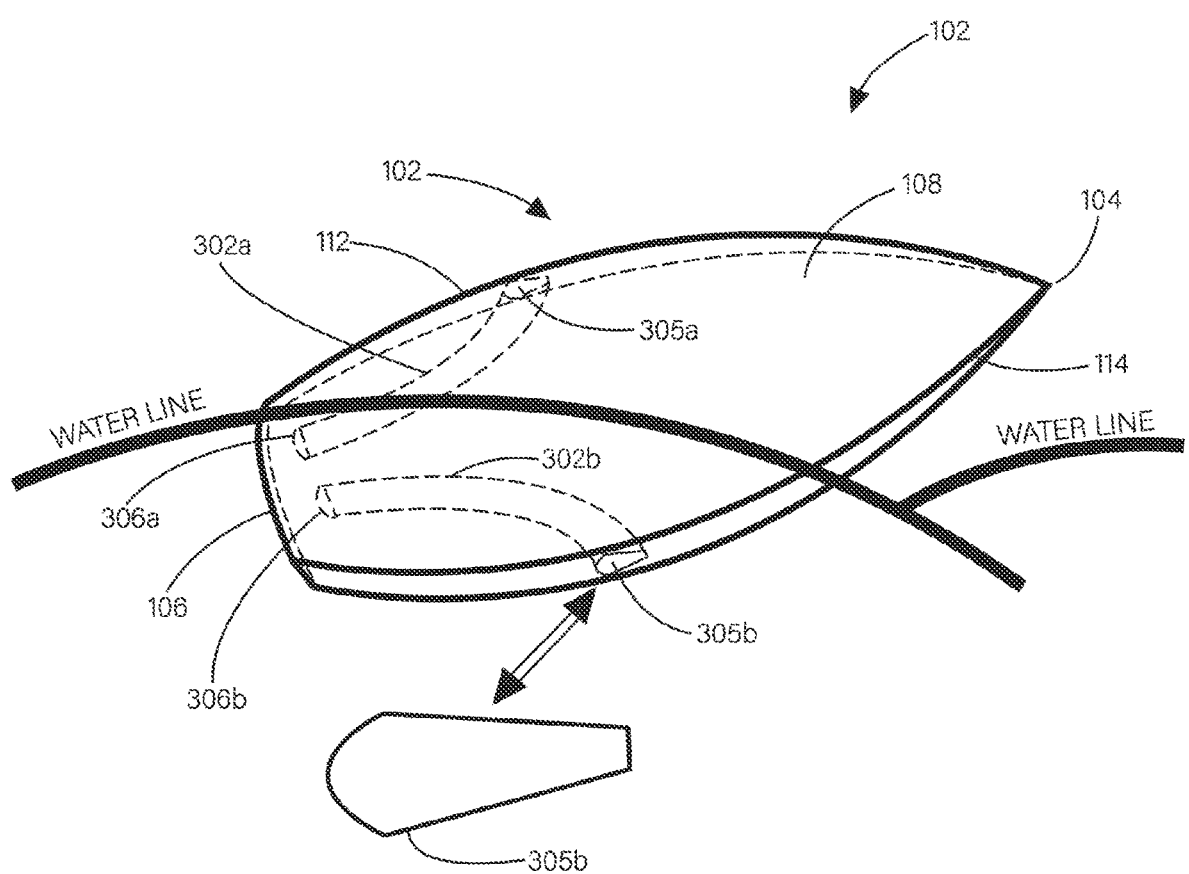

In some embodiments as shown in FIG. 10, the water passageway system 300 may include left and right side water passageways 302a, 302b, respectively, that extend from left and right side inlets 305a, 305b, respectively, to left and right rear outlets 306a, 306b, respectively. In this way, water may pass into the side inlets 305a, 305b, travel through the body 100 of the board 102 via the water passageways 302a, 302b, and out the rear outlets 306a, 306b. Note that in this configuration, the water passageway system 300 may not necessarily include front water inlets 304a, 304b. In addition, the left and right side water inlets 305a, 305b may be tear-shaped as shown.

This architecture may provide improved turning ability, a shorter turning radius and overall improved control of the board 102 when used to perform side maneuvers on a crest of a wave.

Figure 11:
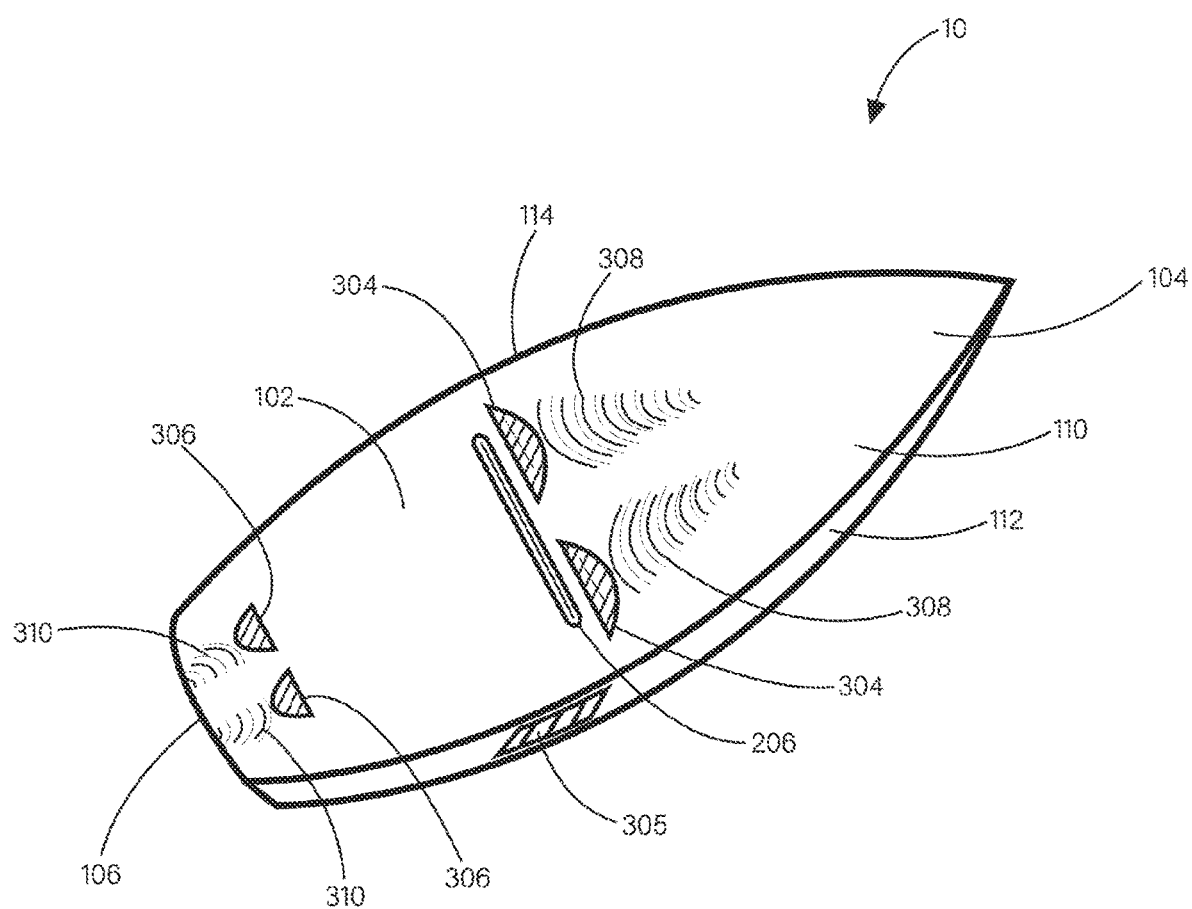

In some embodiments as shown in FIG. 11 (and FIG. 6 as optional and represented with a dashed line), each water inlet 304 may be coupled with a corresponding water input channel 308 adapted to guide water into the inlet 304. In some embodiments, each water inlet 304 may be forward facing and embedded into the board 102 perpendicular from the board's bottom 110, and each water input channel 308 may include an extension of the inlet 304 that transitions forward from the forward facing inlet 304 to the bottom surface 110 of the board 102. In this way, as the board 102 moves forward through the water while in use, water may flow from the board's bottom surface 110 through the water input channel 308 and into the water inlet 304. In some embodiments, the water input channels 308 may include generally concave cross-sections, but it is understood that other cross-sectional shapes also may be used.

In some embodiments, each water input channel 308 may be formed in the board 102 (e.g., as cutouts) in the area in front of each water inlet 304 (towards the board's front 104). In other embodiments, each channel 308 may include an extension of the inlets 304.

In some embodiments, each water outlet 306 may be coupled with water output channels 310 extending from the outlets 306 toward the rear 106 of the board 102. The water output channels 310 may include similar characteristics as described above with respect to the water input channels 308 but may generally face in the opposite direction.

The Assembly

Figure 12:
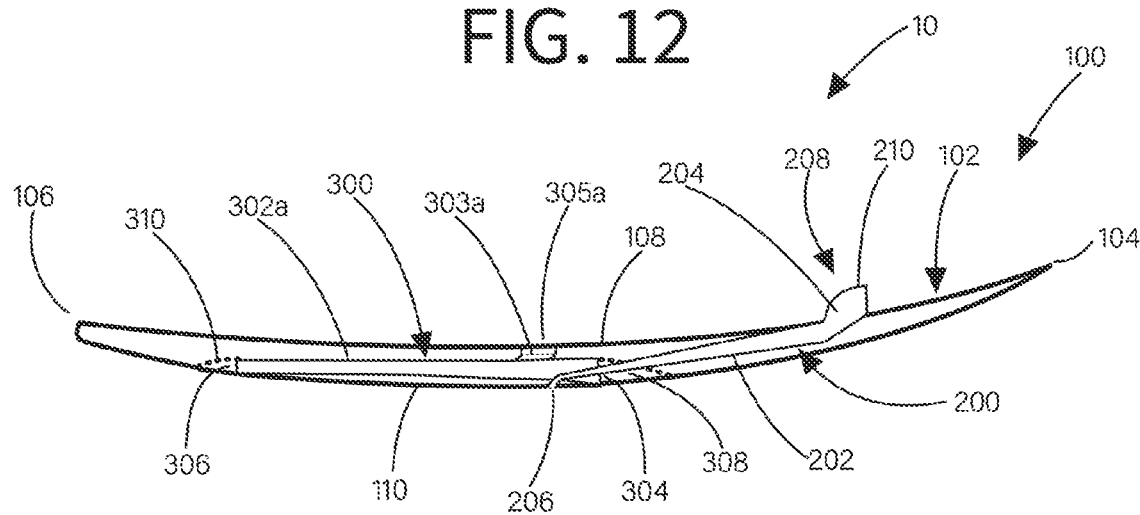
FIGS. 12-17 show aspects of a watercraft system according to exemplary embodiments hereof.

In some embodiments as shown in the cross-sectional view of FIG. 12 and in FIG. 2, the watercraft body 100, the air passageway system 200 and the water passageway system 300 are combined to form the overall watercraft system 10.

As best seen in FIG. 2, in some embodiments, the air passageway 202 (represented as dashed lines) passes through the body 100 of the board 102 from the top 108 to the bottom 110 by passing between the left and right central water passageways 302a, 302b. Once past the left and right central water passageways 302a, 302b, the air passageway may flare out (widen) as it terminates at the air outlet 206 on the bottom 110 of the board 102. Accordingly, as shown in FIG. 12, this places the rear portion of the air passageway 202 in an overlapping configuration between the forward portions of the left and right water passageways 302a, 302b. In this way, air may be introduced out the bottom 110 of the board 102 at a position towards the rear 106 from the water inlets 304a, 304b.

It is understood that the above described architecture of the system 10 is meant for demonstration and that the air passageway system 200 and the water passageway system 300 may be configured with the board body 100 using any suitable placements and/or orientations of the systems 200, 300 with respect to the body 100. It also is understood that the scope of the system 10 is not limited in any way by the placement and/or orientations of the systems 200, 300 with respect to the body 100.

In Use

Figure 13:
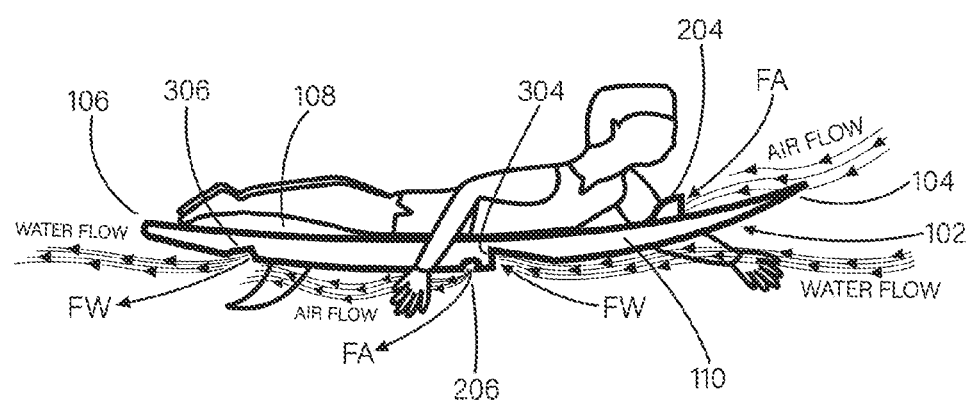

In some embodiments as shown in FIG. 13, the watercraft system 10 may be used when "paddling" on the surfboard 102. As is known in the art, the act of paddling involves the user laying on the top 108 of the board 102 in a prone position (stomach down) such that the user may propel the board 102 forward through the water by paddling with his/her arms and hands.

As shown, as the user propels the board 102 forward using his/her arms and hands, air passes into the air inlet 204, is accelerated through the air passageway 202, and exits out the air outlet 206 at an increased velocity. This is shown by the air flow arrows $F_A$. The air flowing out the air outlet 206 reduces the drag and friction between the board 102 and the water and increases the board's hydrodynamic lift thereby causing the board 102 to lift upward within the water. This in turn may decrease the displaced volume of water by the board 102 resulting in the board experiencing a planing effect.

Simultaneously, water passes into the water inlet 304, is accelerated through the water passageway 302, and exits out the water outlet 306 at an increased velocity. This is shown by the air flow arrows $F_W$. The water flowing out of the water outlet 306 provides the board 102 a forward thrust, and, coupled with the hydrodynamic lift created by the air passageway system 200, results in an accelerated forward motion and a further reduction in the displaced volume of water by the board 102. This combination of air and water passing through the air passageway system 200 and water passageway system 300, respectively, may thereby increase the board's planing effect, efficiency, speed and agility.

Figure 14:
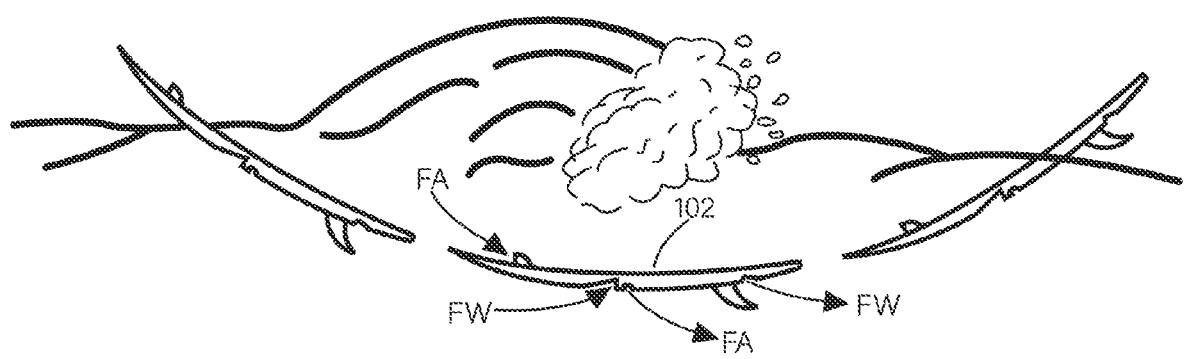

In some embodiments as shown in FIG. 14, the watercraft system 10 may be used when "duck diving" on the surfboard 102. As is known in the art, duck diving is the act of pushing one's surfboard 102 (while paddling) underneath an oncoming wave (that has broken or is about to break) nose-first so that the wave flows over the paddler, thereby minimizing the pushing of the paddler towards the shore. During this activity, the same or similar benefits of the system 10 as described above may be provided.

It is understood that the in-use examples provided above are meant for demonstration and that the system 10 may be used during any type of activities that may benefit from the system 10. It is also understood that the scope of the system 10 is not limited in any way by the types of activities performed using the system 10.

Additional Embodiments

Figure 15:
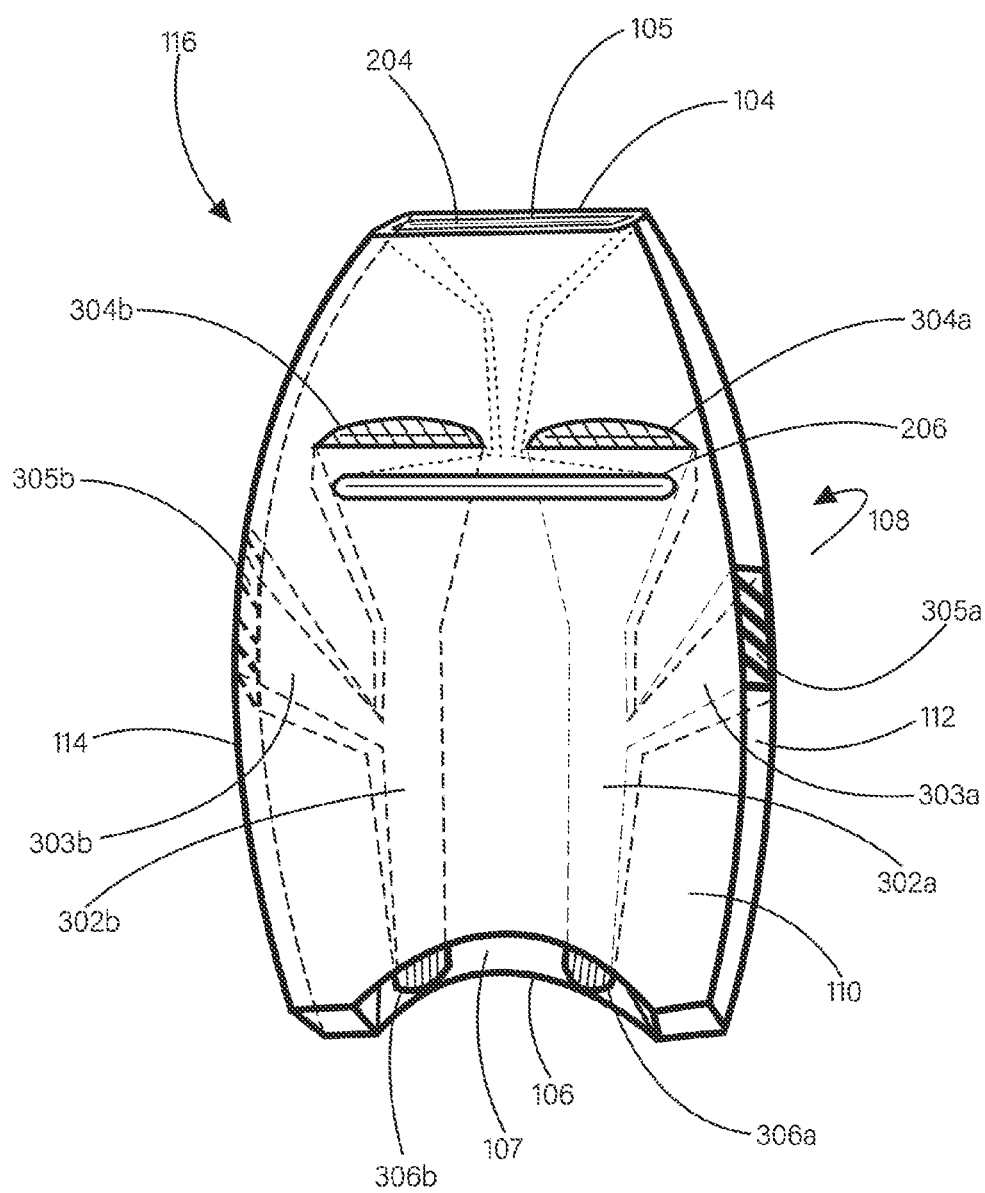
Figure 16:
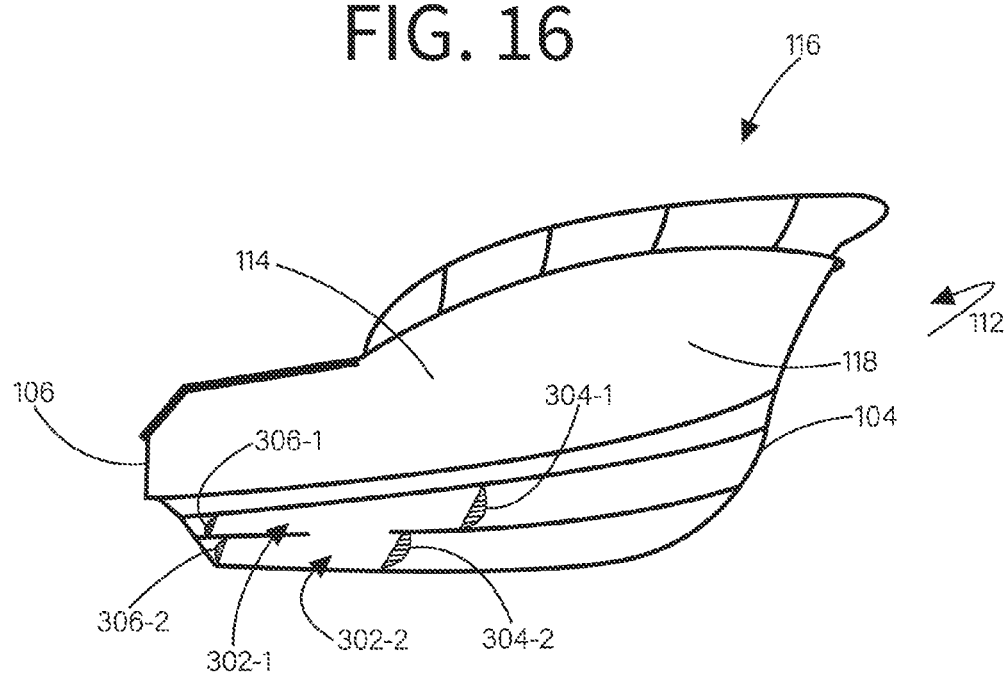
Figure 17:
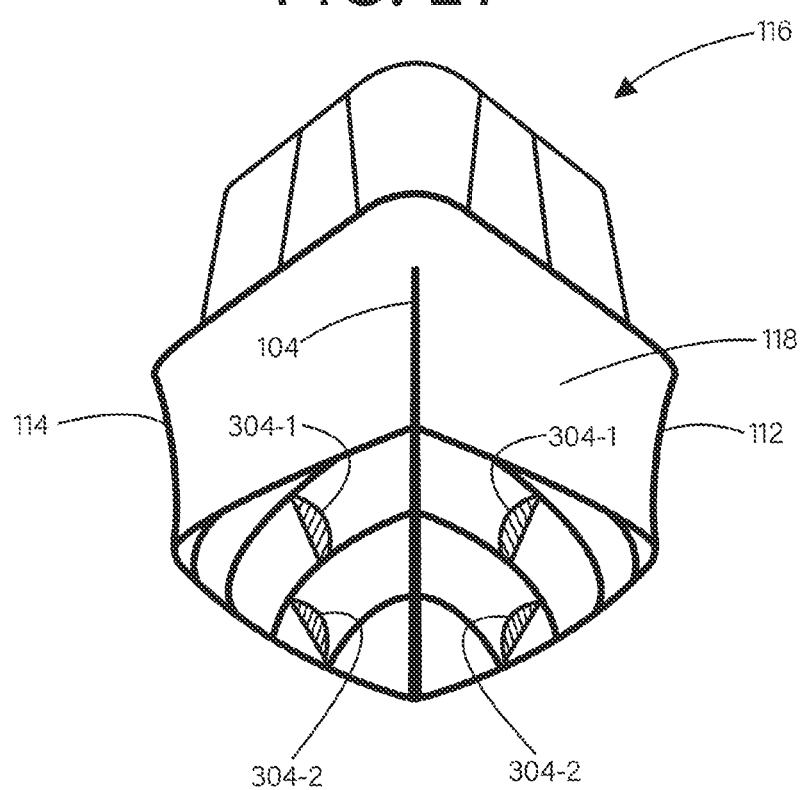

FIGS. 15-17 show additional embodiments of the system 10 as it may pertain to other types of watercrafts. It is understood that these additional embodiments are shown for demonstration and are non-limiting.

In another embodiment as shown in FIG. 15, the watercraft body 100 may include a boogie board 116 (also referred to as a body board 116). As is known in the art, a boogie board 116 may have a length that is less than the length of a standard surfboard 102, and may be used with a person laying on the board 116 in a prone position with his/her torso resting on the board 116 and his/her legs hanging off the back of the board.

In this embodiment, the boogie board 116 may include a forward-facing front wall 105 at its front end 104 and a rear-facing wall 107 at its back end 106. In this embodiment, the air inlet 204 may be positioned in the forward-facing front wall 105, and the water outlets 306a, 306b may be positioned in the rear-facing wall 107. In this way, the air inlet 204 may not necessarily be configured on the top 108 of the board 116, but instead on the front wall 105 of the board 116. Similarly, the water outlet 306a, 306b may not necessarily be configured on the bottom 110 of the board 116, but instead on the rear-facing wall 107 of the board 116.

In another embodiment as shown in FIGS. 16 and 17, the watercraft may include a boat 116 with a hull 118. The hull 118 may include a left side 112 and a right side 114. The hull 118 may include one or more water inlets 304-1, 304-2 and one or more water outlets 306-1, 306-2, with one or more constricting water passageways 302-1, 302-2, respectively, extending therebetween. In this way, water may pass into the water inlets 304-1, 304-2, be accelerated through the constricting water passageways 302-1, 302-2, and exit the water outlets 306-1, 306-2 at increased velocities thereby providing a forward thrust to the watercraft 116.

In some embodiments, the air passageway system 200 may include one or more air thrusters (e.g., fans, propellers, etc.) configured within the air passageway 202 to further accelerate the air as it passes through the air passageways 202. The air thrusters may be electrically powered (e.g., by battery, sunlight, etc.), by combustible fuel or by other power sources.

In some embodiments, the water passageway system 300 may include one or more water thrusters (e.g., propellers, impellers, etc.) configured within the water passageways 302 to further accelerate the water as it passes through the water passageways 302. The water thrusters may be electrically powered (e.g., by battery, sunlight, etc.), by combustible fuel or by other power sources.

It is understood that any details and aspects of any embodiments described herein may be combined in any way to form an additional embodiment that also is within the scope of the system 10.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

The invention claimed is:

1. A watercraft system comprising:
a watercraft body adapted to float on a surface of water and including a top, a bottom, a front, a back, a left side and a right side;
a first passageway passing through the watercraft body from a first top inlet in the top to a first bottom outlet in the bottom; and
a second passageway passing through the watercraft body from a first bottom inlet in the bottom positioned near the front to a second bottom outlet in the bottom positioned near the back;
wherein the first top inlet includes a first top inlet cross-sectional area and the first bottom outlet includes a first bottom outlet cross-sectional area, and the first top inlet cross-sectional area is larger than the first bottom outlet cross-sectional area; and
wherein the first bottom inlet includes a first bottom inlet cross-sectional area and the second bottom outlet includes a second bottom outlet cross-sectional area, and the first bottom inlet cross-sectional area is larger than the second bottom outlet cross-sectional area.

2. The watercraft system of claim 1 wherein the first bottom outlet is positioned closer to the back compared to the first bottom inlet.

3. The watercraft system of claim 1 further comprising a third passageway passing through the watercraft body from a second bottom inlet in the bottom positioned near the front to a third bottom outlet in the bottom positioned near the back, the second bottom inlet including a second bottom inlet cross-sectional area and the third bottom outlet including a third bottom outlet cross-sectional area, wherein the second bottom inlet cross-sectional area is larger than the third bottom outlet cross-sectional area.

4. The watercraft system of claim 3 wherein the second passageway and the third passageway mirror one another about the median plane of the watercraft body.

5. The watercraft system of claim 4 wherein the first passageway passes between the second passageway and the third passageway within the watercraft body.

6. The watercraft system of claim 3 further comprising a fifth passageway passing through the watercraft body from a right side inlet in the right side to a right side junction with the third passageway within the watercraft body, the right side inlet including a right side inlet cross-sectional area and the right side junction including a right side junction cross-sectional area, wherein the right side inlet cross-sectional area is larger than the right side junction cross-sectional area.

7. The watercraft system of claim 6 wherein the right side inlet is adapted to receive water passing from the front of the watercraft to the right side inlet, and the third bottom outlet is adapted to output the water towards the back of the watercraft.

8. The watercraft of claim 3 further comprising a second water input channel coupled with the third passageway at the second bottom inlet.

9. The watercraft system of claim 1 further comprising a fourth passageway passing through the watercraft body from a left side inlet in the left side to a left side junction with the second passageway within the watercraft body, the left side inlet including a left side inlet cross-sectional area and the left side junction including a left side junction cross-sectional area, wherein the left side inlet cross-sectional area is larger than the left side junction cross-sectional area.

10. The watercraft system of claim 9 wherein the left side inlet is adapted to receive water passing from the front of the watercraft to the left side inlet, and the second bottom outlet is adapted to output the water towards the back of the watercraft.

11. The watercraft system of claim 1 further comprising a top shroud adapted to guide air into the first top inlet.

12. The watercraft system of claim 1 wherein the first top inlet is adapted to receive air passing from the front of the water craft to the first top inlet, and the first bottom outlet is adapted to output the air towards the back of the watercraft.

13. The watercraft system of claim 1 wherein the first bottom inlet is adapted to receive water passing from the front of the watercraft to the first bottom inlet, and the second bottom outlet is adapted to output the water towards the back of the watercraft.

14. The watercraft system of claim 1 further comprising one or more diffusers configured at the first bottom outlet.

15. The watercraft of claim 1 further comprising a first water input channel coupled with the second passageway at the first bottom inlet.

16. A watercraft system comprising:
- a watercraft body adapted to float on a surface of water and including a top, a bottom, a front, a back, a left side and a right side;
- a first passageway passing through the watercraft body from a first top inlet in the top to a first bottom outlet in the bottom; and
- a second passageway passing through the watercraft body from a first bottom inlet in the bottom positioned near the front to a first back outlet in the back;
- wherein the first top inlet includes a first top inlet cross-sectional area and the first bottom outlet includes a first bottom outlet cross-sectional area, and the first top inlet cross-sectional area is larger than the first bottom outlet cross-sectional area; and
- wherein the first bottom inlet includes a first bottom inlet cross-sectional area and the first back outlet includes a first back outlet cross-sectional area, and the first bottom inlet cross-sectional area is larger than the first back outlet cross-sectional area.

17. The watercraft system of claim 16 further comprising a third passageway passing through the watercraft body from a second bottom inlet in the bottom positioned near the front to a second back outlet in the back, the second bottom inlet including a second bottom inlet cross-sectional area and the second back outlet including a second back outlet cross-sectional area, wherein the second bottom inlet cross-sectional area is larger than the second back outlet cross-sectional area.

18. The watercraft system of claim 17 wherein the second passageway and the third passageway mirror one another about the median plane of the watercraft body.

19. The watercraft system of claim 18 wherein the first passageway passes between the second passageway and the third passageway within the watercraft body.

20. The watercraft system of claim 16 further comprising a fourth passageway passing through the watercraft body from a side inlet in the left side or right side to a side junction with the second passageway within the watercraft body, the side inlet including a side inlet cross-sectional area and the side junction including a side junction cross-sectional area, wherein the side inlet cross-sectional area is larger than the side junction cross-sectional area.

\* \* \* \* \*